(12) United States Patent
Wajda

(10) Patent No.: US 8,296,871 B2
(45) Date of Patent: Oct. 30, 2012

(54) TOILET WATER TANK REFILLING SYSTEM

(76) Inventor: George J. Wajda, San Diego, CA (US)

( * ) Notice: Subject to any disclaimer, the term of this patent is extended or adjusted under 35 U.S.C. 154(b) by 0 days.

(21) Appl. No.: 12/966,695

(22) Filed: Dec. 13, 2010

(65) Prior Publication Data

US 2012/0144571 A1    Jun. 14, 2012

(51) Int. Cl.
*E03D 1/00* (2006.01)
(52) U.S. Cl. ............................................. 4/415; 137/434
(58) Field of Classification Search ...... 4/415; 137/441, 137/434, 436–437
See application file for complete search history.

(56) References Cited

U.S. PATENT DOCUMENTS

| | | | | |
|---|---|---|---|---|
| 517,575 | A | * | 4/1894 | Knapp et al. ................... 137/436 |
| 1,112,533 | A | * | 10/1914 | Griffiths ......................... 137/437 |
| 2,589,265 | A | | 3/1952 | Langdon |
| 2,962,727 | A | | 12/1960 | Kanter et al. |
| 3,086,546 | A | | 4/1963 | Brown |
| 3,438,064 | A | * | 4/1969 | Taien ................................ 4/403 |
| 3,932,900 | A | * | 1/1976 | Huston et al. ................. 137/386 |
| 4,120,056 | A | | 10/1978 | Phripp et al. |
| 4,145,775 | A | | 3/1979 | Butler |
| 4,283,802 | A | * | 8/1981 | Icaran ............................... 4/353 |
| 4,365,364 | A | | 12/1982 | Riedel |
| 4,764,996 | A | | 8/1988 | Pino |
| 4,841,580 | A | | 6/1989 | Agostino |
| 4,980,932 | A | * | 1/1991 | Stemples .......................... 4/415 |
| 5,142,710 | A | | 9/1992 | Olson |
| 5,287,565 | A | | 2/1994 | Auman et al. |
| 5,924,143 | A | | 7/1999 | Harrison |
| 6,219,856 | B1 | | 4/2001 | Alles |

* cited by examiner

*Primary Examiner* — Gregory Huson
*Assistant Examiner* — Christine Skubinna
(74) *Attorney, Agent, or Firm* — Richard C. Litman

(57) ABSTRACT

The toilet water tank refilling system includes an inlet pipe adapted for installation within the toilet water tank and adapted for connection to a water supply, a valve connected to the pipe, a float operably connected to the valve to open the valve when the water level falls below a predetermined level and to close the valve when the water level in the tank reaches the predetermined level, and a valve outlet discharging water from the water supply into the tank when the valve is open. The system does not have a valve outlet discharging water from the water supply through the overflow tube directly into the toilet bowl. The only paths for discharging water from the water supply to the toilet bowl in the toilet water tank refilling system are through the tank's flush valve when the toilet is flushed and through the overflow tube when the water level in the tank exceeds the predetermined level.

1 Claim, 6 Drawing Sheets

TOILET WATER TANK REFILLING SYSTEM

BACKGROUND OF THE INVENTION

1. Field of the Invention

The present invention relates to toilets, and more specifically to a toilet water tank refilling system for minimizing water expenditure and for promoting water conservation.

2. Description of the Related Art

Modern toilets consume more water than necessary. Part of this problem occurs when the toilet is flushed and the tank and bowl are refilled. The flush toilet includes a flush valve that includes a flush valve seat formed at the base of the tank and a valve body (either a ball or a flapper). The toilet handle has a lever extending therefrom, the lever having a chain at one end that is attached to the valve body. Then the user depresses the handle, the chain lifts the flush valve body from the valve seat, causing the volume of water in the tank to pass through the valve to flush waste from the bowl. The bowl has a trap defined therein that leads to a drain or sewer pipe. The influx of water from the tank into the bowl forces some water over the trap, starting a siphoning effect that empties waste from the toilet bowl.

The toilet has a ballcock and float assembly or fill valve for refilling the tank. There are many different ballcock and float assemblies. One type of ballcock assembly has a vertical tube with a float attached to an arm extending laterally from the vertical tube. Another type of ballcock assembly has a vertical tube with a concentric or cup-type float encircling the vertical tube. Within each different type of ballcock assembly, there are many variations in the construction of the vertical tube, in the construction of the valve at the head of the tube, and in the construction of the float. Regardless of type or structural details, however, ballcock and float assemblies function in the same manner.

The ballcock assembly is connected to the water supply, and includes a valve that is normally closed and blocks the flow of water from the water supply into the tank when the tank is filled to a predetermined level. When the toilet is flushed, the water level in the tank falls, causing the float to descend in the tank. This opens the valve to allow water to flow into the tank. As the water level falls, the flush valve body slowly re-seats on the valve seat, blocking the flow of water from the tank to the bowl. The tank then fills, raising the float. When the float rises to the predetermined water level, the float shuts off or closes the fill valve in the ballcock assembly.

The tank usually has an overflow tube that allows excess water to flow from the tank to the bowl if the water level should exceed the predetermined level set by the ballcock and float assembly. Virtually all ballcock and float assemblies also include a refill tube that extends from the fill valve and is clipped to the top of the overflow tube. When the float opens the fill valve, a portion of the water flows through the refill tube and the overflow tube. However, the maximum water level in the toilet bowl is determined by the structure of the trap. Any water above this level that may flow into the bowl through the refill tube/overflow tube path pushes more water through the trap and down the drain to the sewer, and is therefore wasted.

The present inventor has performed some testing where the refill tube was removed from the overflow tube and redirected into a bucket. All the water from the refill tube began to flow into the bucket from the time that the toilet was flushed and the flapper was lifted; it did not stop flowing until the float returned from the lower part of the toilet tank to the top of the tank and was cut off by the ballcock. Flushing a toilet showed that over a gallon of water flows through the refill tube, this being determined by the amount of water that flowed into the bucket. Waste was flushed from the bowl by the water released from the tank, but the bowl did not remain empty. Modern toilets are constructed so that the trap always fills quickly with water to prevent sewer gas and waste from refluxing back into the toilet. At some point when flushing the toilet, the bowl filled quickly with water, replacing the waste water with fresh water from the tank, always keeping a seal to prevent sewer gas from entering the room. In the inventor's testing, the water level in the bowl resulting from the above testing with the refill tube disconnected from the overflow tube was sufficient to flush waste, both solid and liquid, without the need of any water coming from the refill tube.

Assuming that an average person performs six flushes a day for a year, the water that flows through the refill tube results in a potential loss of a little over one gallon per flush, since none of the water from the refill tube adds to filling the bowl, but all of it is flushed down the drain or sewer pipe by the siphoning action that occurs when the toilet is flushed, or by pushing additional water through the trap to keep the maximum water level in the toilet bowl at the level determined by the trap. Thus, there is a need to eliminate the amount of water lost through refilling the toilet bowl through the refill tube-overflow tube path in the modern toilet.

Thus, a toilet water tank refilling system solving the aforementioned problems is desired.

SUMMARY OF THE INVENTION

The toilet water tank refilling system includes an inlet pipe adapted for installation within the toilet water tank and adapted for connection to a water supply, a valve connected to the pipe, a float operably connected to the valve to open the valve when the water level falls below a predetermined level and to close the valve when the water level in the tank reaches the predetermined level, and a valve outlet discharging water from the water supply into the tank when the valve is open. The system does not have a valve outlet discharging water from the water supply through the overflow tube directly into the toilet bowl. The only paths for discharging water from the water supply to the toilet bowl in the toilet water tank refilling system are through the tank's flush valve when the toilet is flushed and through the overflow tube when the water level in the tank exceeds the predetermined level.

When the toilet is flushed, the flapper is lift up, allowing water to drain from the tank and to fill the toilet bowl. This begins to drop the water level in the tank, which lowers the float. The float is connected to the ballcock shutoff switch, so that when the float lowers, the ballcock switch turns on the water to refill the tank. The flow of water into the tank will not stop until the float has returned to the top of the tank and turns off the ballcock switch, cutting off the flow of water into the tank.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
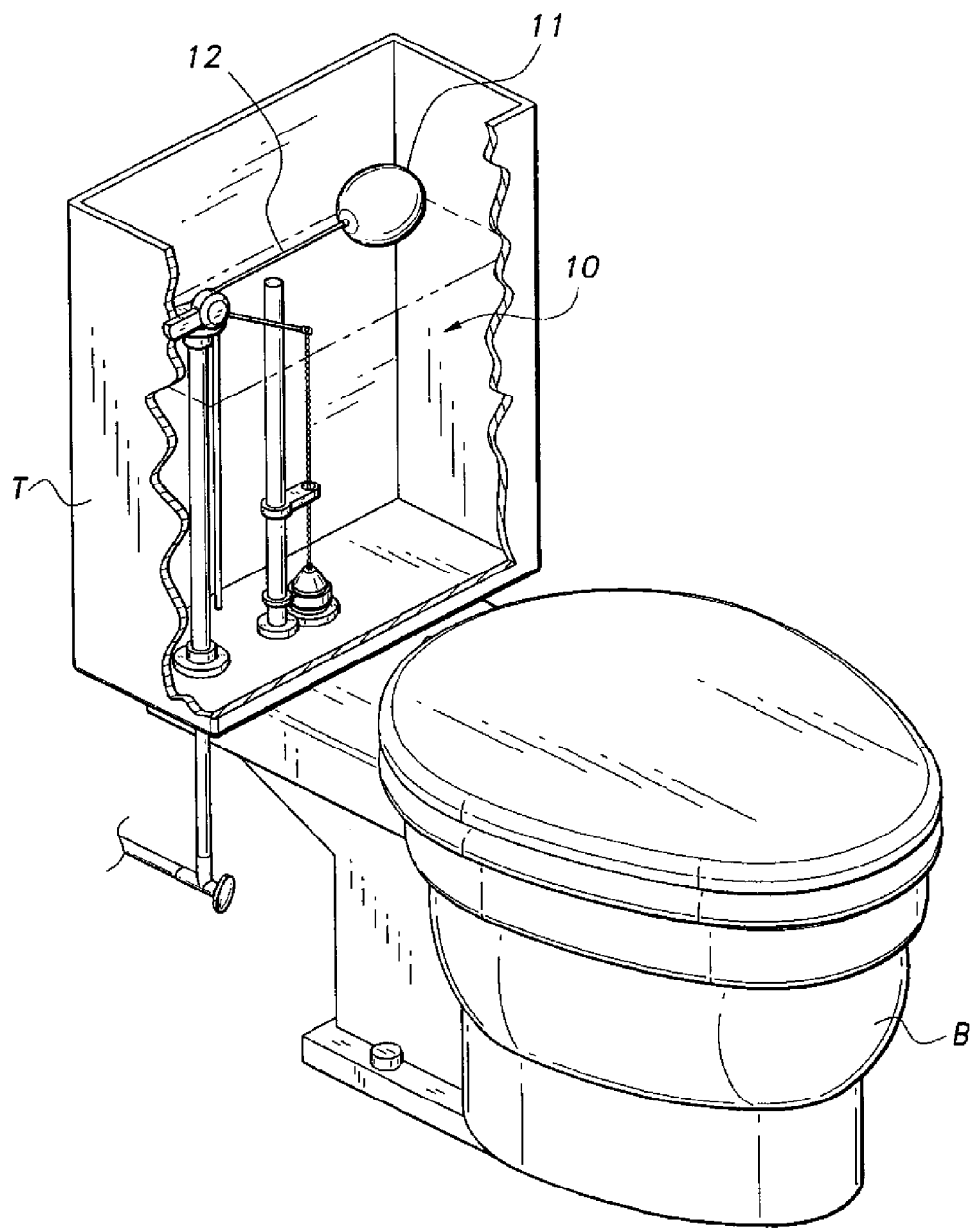
FIG. 1 is an environmental, perspective view of a toilet having a toilet water tank refilling system according to the present invention, the tank being broken away and partially in section to show the refilling system.
Figure 2:
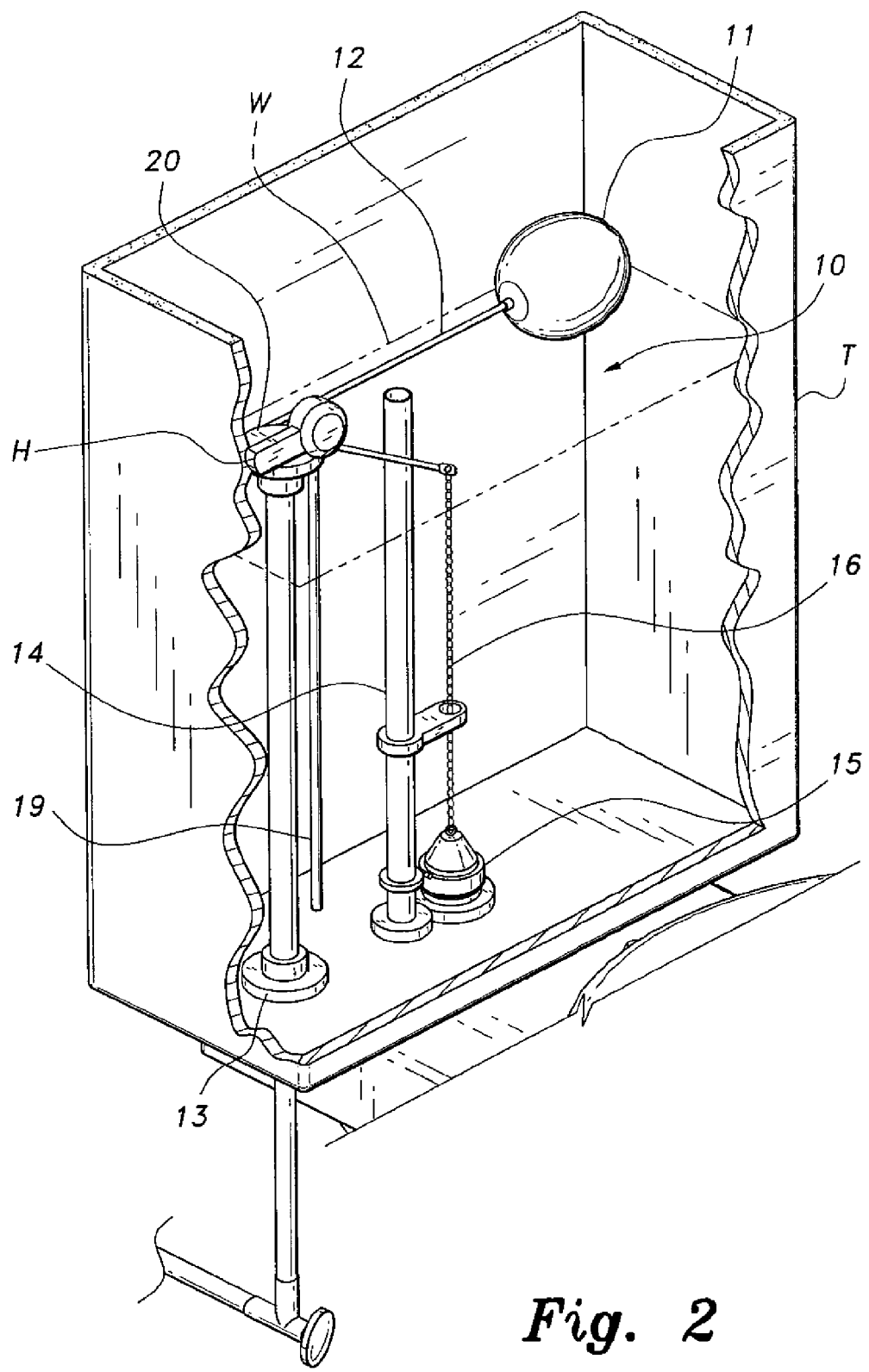
FIG. 2 is an environmental perspective view of a toilet water tank, the tank being broken away and partially in section to show further details of the toilet water tank refilling system according to the present invention.

The present invention relates to a toilet water tank refilling system, generally referred to by reference number 10, which significantly reduces water waste by minimizing water usage during a toilet tank flushing operation. As shown in FIGS. 1 and 2, the toilet water tank refilling system 10 includes a water inlet pipe or tube 13 disposed inside a toilet tank T. The inlet pipe 13 is connected to a water supply. A water level-actuated fill valve 20 is disposed atop the inlet pipe 13 to control water flow into the tank T and fill the same.

In the embodiment shown in the drawings, a float 11 selectively actuates the fill valve 20 by its operative connection through a float arm 12. Thus, when the float 11 reaches a predefined maximum height because of the rising water level W, the float 11 closes the fill valve 20. During a flushing operation, the float 11 falls and opens the fill valve 20.

The fill valve 20 includes a downwardly extending fill tube 19 attached to a single outlet passage or opening in the valve. When the fill valve 20 is opened, the fill valve 20 directs water supplied by the inlet pipe 13 to the fill tube 19 and thereby refills the tank T.

Figure 3:
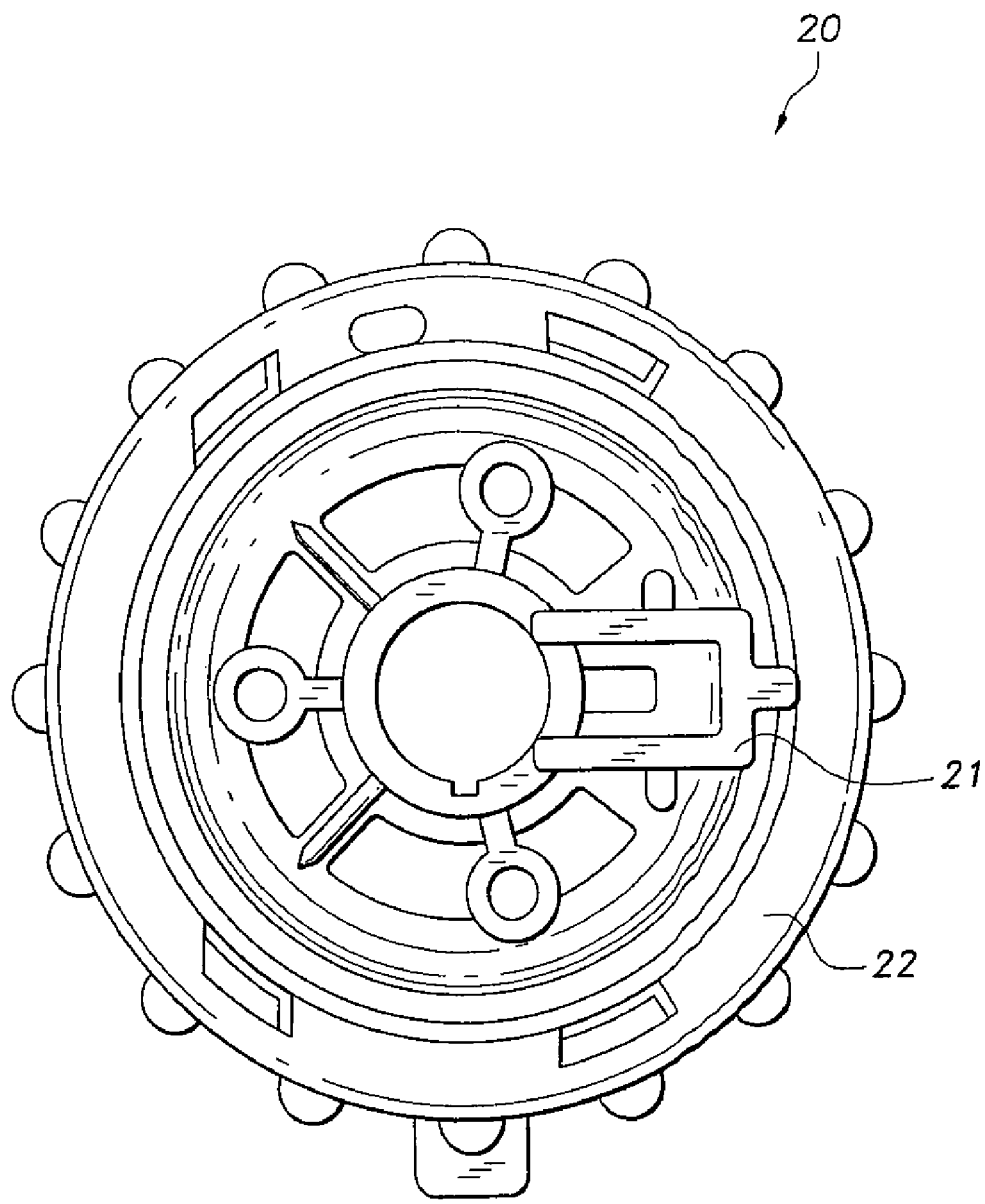
FIG. 3 is a top view of a fill valve for a toilet water tank refilling system according to the present invention.
Figure 4:
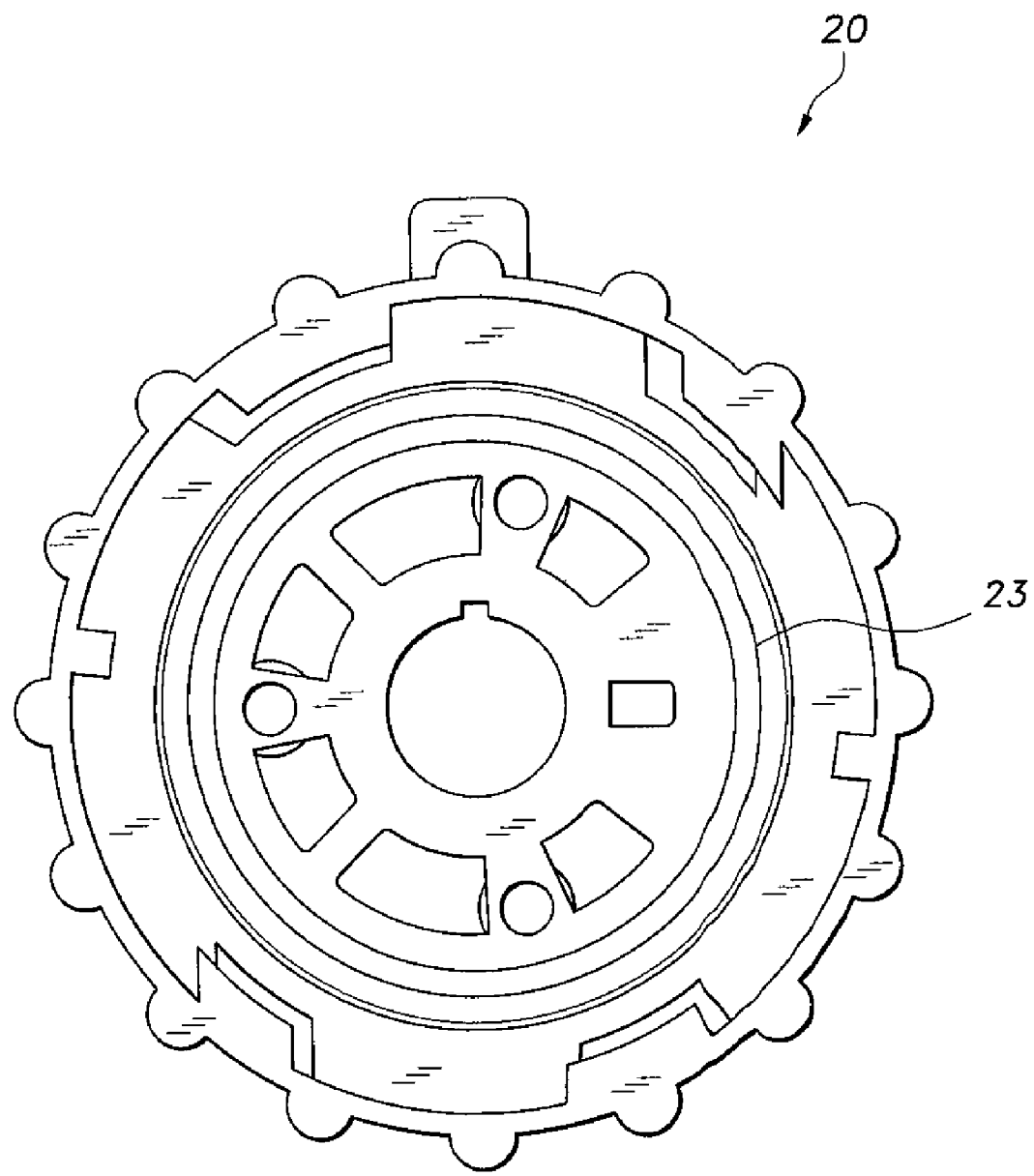
FIG. 4 is a bottom view of the cap portion of the fill valve for a toilet water tank refilling system according to the present invention.
Figure 6:
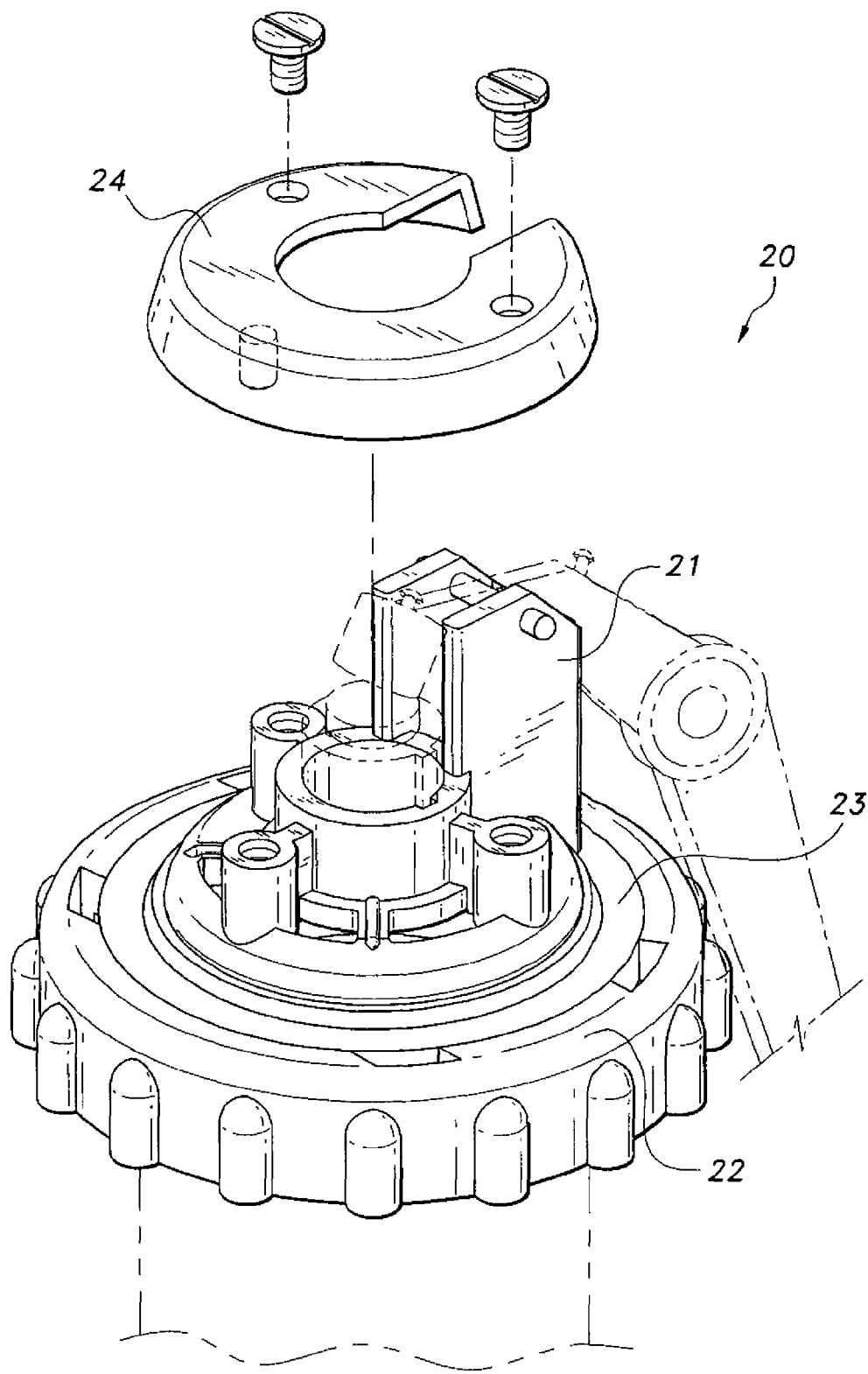
FIG. 6 is a partially exploded view of the fill valve shown in FIGS. 3 and 4.

As shown in FIGS. 3 and 4, the cap 22 of the fill valve 20 includes a mounting bracket 21 for the float arm. Unlike conventional ballcock valves, the cap 22 does not include a projecting nozzle to fit a refill tube. As a consequence, the interior 23 of the cap 22 does not include a notch or groove for selectively opening or closing a passage to a refill tube. To further illustrate, FIG. 6 shows the fill valve 20 with the cover removed to better show the interior of the valve 20. As shown, the interface between the cap 22 and the interior 23 is unbroken. There is no notch on the interior 23, nor a projecting nozzle in communication with the notch. Instead, the valve 20 opens and closes in response to the water level to only supply water to the fill tube 19. It is noted that while the above discloses a specific example of a fill valve, the teachings thereof may be applied to other similar water level-actuated fill valves, e.g., to a concentric or cup float.

Figure 5:
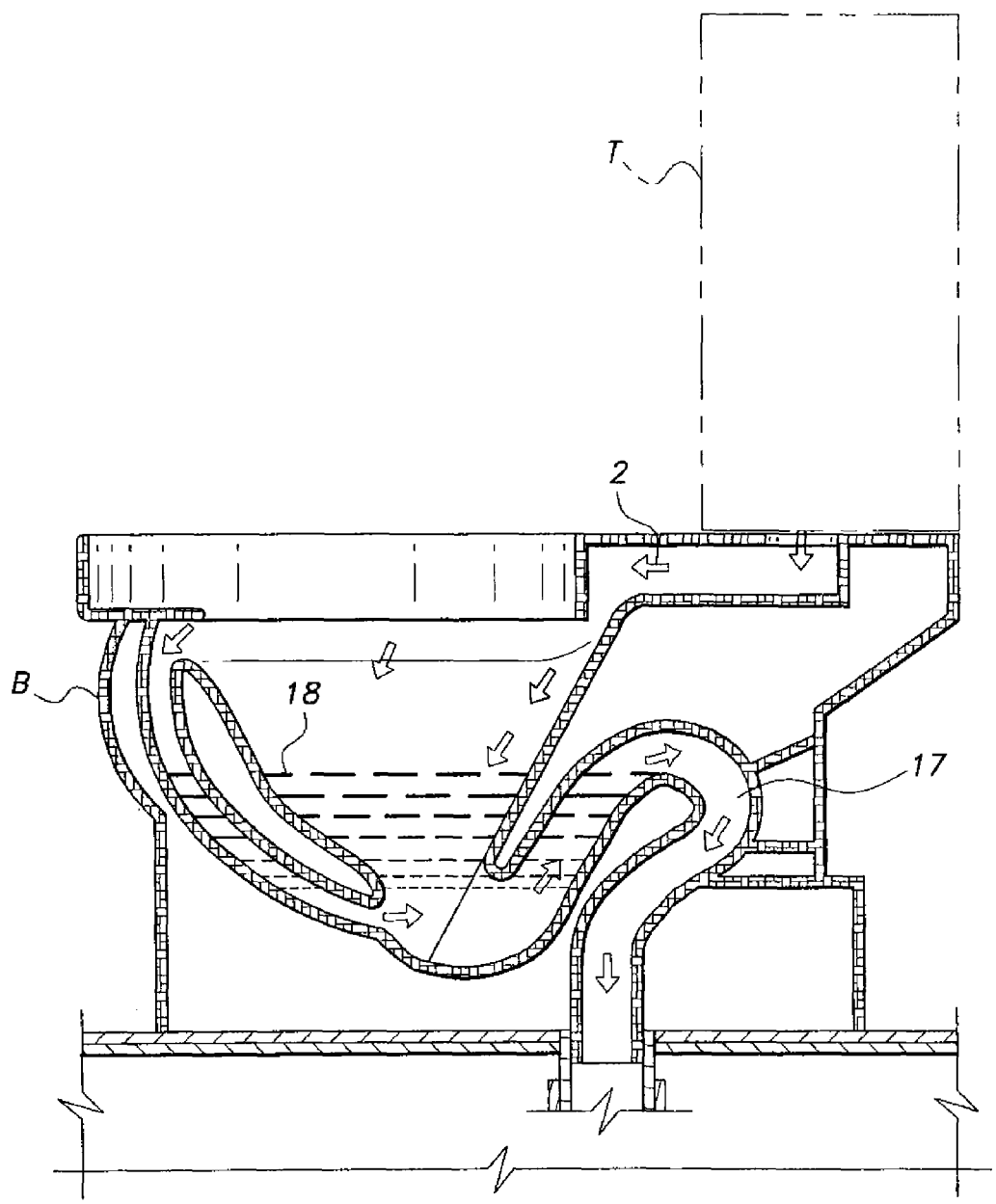
FIG. 5 is a side view in section of a toilet bowl, showing the flow of water in a toilet having a toilet water tank refilling system according to the present invention.

Turning to FIGS. 1, 2 and 5, the following describes how the toilet water tank refill system 10 is used and the effects thereof. When a toilet requires flushing, the user operates the handle H to lift the flapper valve 15 through their operative connection to the chain 16. Lifting of the flapper valve 15 drains water into the toilet bowl B, as indicated by arrows 2. The action of the fill valve 20 (ballcock) and the float 11 ensures that the water filling the tank does not reach above a predetermined maximum allowable water level. Any excess that might occur if the fill valve 20 malfunctions through wear or the like drains through the overflow tube directly into the bowl B. As the water level W in the tank lowers, the float 11 also falls and opens the fill valve 20. At the same time, the flapper valve 15 slowly falls to recap the drain hole or flush valve seat in the tank T.

Referring to FIG. 5, as the water level 18 in the bowl B rises from the influx of flushing water, the water level trap also rises. Once the water level 18 reaches above the bend in the trap, an overflow and siphoning action occurs to flush the water through the sewage drain.

Even before the flapper valve 15 closes, enough water flows through the tank flush valve to flush and refill the toilet bowl B to a predetermined water level due, in part, to the fill valve 20 refilling the tank T at the same time. Once the flapper valve 15 is closed, the tank T fills up with water until the float 11 reaches a predetermined height, closing the fill valve 20.

Thus, it can be seen that no excess water is introduced into the tank or the bowl B. The single outlet in the fill valve 20 performs the sole function of refilling the tank T, and no refill tube is connected thereto to drain water through the overflow tube 14. Water only flows through the overflow tube when the water level in the tank rises above the open upper end of the overflow tube. As a result, there is minimal water waste and water is conserved.

It is to be understood that the present invention is not limited to the embodiments described above, but encompasses any and all embodiments within the scope of the following claims.

I claim:

1. A toilet, consisting of:

a toilet bowl;

a water tank extending above the toilet bowl, the water tank having a flush opening and an overflow opening in fluid communication with the toilet bowl;

a trap disposed between the bowl and a sewer system;

an overflow tube attached to the overflow opening and extending upward in the tank, the overflow tube having an open upper end;

a ballcock assembly mounted in the tank, the ballcock assembly consisting of:

i) an inlet pipe adapted for connection to a water supply;

ii) a water level-actuated, single outlet fill valve connected to the inlet pipe, wherein the fill valve has a single, fixed path for discharging water delivered through the inlet pipe, the single path extending through the valve outlet; and iii) a fill tube connected to the single outlet fill valve, the fill tube discharging water from the inlet pipe directly into the toilet tank when the fill valve is open;

a float operably connected to the fill valve, the float opening the fill valve when water level in the tank falls below a predetermined level and closing the fill valve when the float rises to the predetermined water level, wherein the float further comprises an arm operably connecting the float to the fill valve; and a selectively operable flush valve system having a closed position sealing the flush opening in the water tank , wherein the valve system includes a flapper valve and chain, and an open position releasing water from the tank to flush the toilet and re-seal the trap to prevent backflow of sewer gases into the toilet bowl;

wherein water only flows through the overflow pipe when the water in the tank rises to a level above the open upper end of the overflow tube, thereby eliminating the use of a refill tube.

* * * * *